US009407071B2

(12) United States Patent
Degli Innocenti et al.

(10) Patent No.: US 9,407,071 B2
(45) Date of Patent: Aug. 2, 2016

(54) ACCESSORY DEVICE ASSEMBLY FOR LOW AND MEDIUM VOLTAGE SWITCHING DEVICES

(71) Applicant: ABB S.p.A., Milan (IT)

(72) Inventors: Luigi Arturo Degli Innocenti, Bergamo (IT); Riccardo Panseri, Bergamo (IT)

(73) Assignee: ABB S.p.A., Milan (IT)

( * ) Notice: Subject to any disclaimer, the term of this patent is extended or adjusted under 35 U.S.C. 154(b) by 342 days.

(21) Appl. No.: 13/888,769

(22) Filed: May 7, 2013

(65) Prior Publication Data

US 2014/0029167 A1    Jan. 30, 2014

(30) Foreign Application Priority Data

May 7, 2012    (EP) ..................................... 12167034

(51) Int. Cl.
*H02B 1/26* (2006.01)
*H01H 71/08* (2006.01)
*H01H 71/02* (2006.01)
*H02B 1/32* (2006.01)

(52) U.S. Cl.
CPC ............. *H02B 1/26* (2013.01); *H01H 71/0271* (2013.01); *H01H 71/08* (2013.01); *H01H 2071/0278* (2013.01); *H01H 2071/086* (2013.01); *H02B 1/32* (2013.01)

(58) Field of Classification Search
CPC ............ H02B 1/26; H02B 1/32; H01H 71/08; H01H 71/0228; H01H 71/0271; H01H 2071/086; H01H 2071/0278; H01H 83/10; H01H 83/12; H01H 2011/0068

USPC .................................................. 361/600-678
See application file for complete search history.

(56) References Cited

U.S. PATENT DOCUMENTS

| 7,791,862 B2 | 9/2010 | Mathes et al. |
| 7,961,480 B2 * | 6/2011 | Besana et al. ................. 361/837 |
| 8,471,162 B2 * | 6/2013 | Scola et al. ................... 200/303 |
| 2010/0326802 A1 | 12/2010 | Scola et al. |

FOREIGN PATENT DOCUMENTS

| EP | 1724803 A2 | 11/2006 |
| EP | 2020669 A1 | 2/2009 |
| WO | WO-2009095330 A1 | 8/2009 |

OTHER PUBLICATIONS

Chinese Office Action issued on Apr. 19, 2016 for the corresponding Chinese Patent Application No. 201310163027.8.

* cited by examiner

*Primary Examiner* — Zachary M Pape
(74) *Attorney, Agent, or Firm* — Polsinelli PC

(57) ABSTRACT

The invention relates to an accessory device assembly for a low or medium voltage switching device. The accessory device assembly comprises at least a first accessory device comprising a first external housing, first electrical connection means for electrical connection with said switching device, second electrical connection means for electrical connection with outside equipment, third electrical connection means for electrical connection with a second accessory device, first mechanical connection means for mechanical connection with said second accessory device and second mechanical connection means for mechanical connection with said switching device.

12 Claims, 11 Drawing Sheets

ACCESSORY DEVICE ASSEMBLY FOR LOW AND MEDIUM VOLTAGE SWITCHING DEVICES

CROSS REFERENCE TO RELATED APPLICATIONS

This application claims priority to Application No. 12167034.3 filed in Europe on May 7, 2012, under 35 U.S.C. §119; the entire contents which is hereby incorporated by reference.

The present invention relates to the technical field of the low and medium voltage switching devices, such as circuit breakers, disconnectors and contactors and the like.

More particularly, the present invention is related to an accessory devices assembly for low and medium voltage switching devices.

As is known, low voltage and medium voltage switching devices are used in power distribution networks.

Within the framework of the present invention the term "low voltage" relates to voltages lower than 1 kV AC and 1.5 kV DC while the term "medium voltage" relates to voltages lower than 72 kV AC and 100 kV DC.

Switching devices generally comprise a switching unit having an external casing that houses one or more electric poles, each one comprising at least one movable contact and a corresponding fixed contact.

A driving mechanism causes the movement of the movable contacts between a first coupling position (closed position), in which they are coupled to the corresponding fixed contacts, and a second separation position (open position), in which they are spaced away from the corresponding fixed contacts.

The driving mechanism is typically actuated by a protection and control unit, operatively associated with the switching device.

Typically, the protection and control unit is housed within the switching unit.

Nonetheless, arrangements are known, in which the protection and control unit is installed separately from the switching unit and, possibly, in a remote position with respect to it.

Normally, the switching unit of a switching device houses also one or more accessory devices that are aimed at improving or extending the functionalities of the switching unit or the protection and control unit.

As an example, some accessory devices may be solenoids, actuators or other active devices operatively associated with the driving mechanism of the switching unit.

Other accessory devices may be arranged to be interfaced with internal parts of the switching unit or the protection and control unit, so as to acquire and transmit information about the operating state of the switching unit.

Further accessory devices may be arranged to enable the transformation of signals coming from the protection and control unit or outside equipment into commands for actuating the driving mechanism of the switching unit.

The presence of various accessory devices typically entails the arising of relevant problems in terms of complexity of wiring operations.

As is known, a switching device can be used in a fixed configuration, i.e. with the switching unit permanently fixed to a cabinet support in its installation position, and in a withdrawable configuration, i.e. with the switching unit operatively associated to a fixed supporting frame, into/from which it can be easily inserted/withdrawn.

This circumstance makes the above evidenced drawbacks even more difficult to overcome.

In fact, accessory devices are traditionally provided with wiring arrangements of a different type according to the configuration selected for the switching device.

This solution entails relevant drawbacks for what concerning the manufacturing, installation and maintenance costs of the switching device.

Wiring operations of accessory devices are relatively complex and expensive to carry out.

Further, if the switching device is required to change its configuration, it is necessary to re-adapt the wiring of the related accessory devices.

Other drawbacks specifically concern the switching devices of the withdrawable type.

When the switching unit is brought in the withdrawn position, any connection with the outside world of the accessory devices and/or the protection and control unit is typically interrupted.

Thus, any information resident in the accessory devices and/or in the control or protection unit is lost, at least momentarily.

The protection and control unit and the accessory devices therefore need to be re-configured or checked when the switching unit is brought again in the inserted position.

In the market it is still felt the demand for technical solutions capable of solving, at least partially, the drawbacks mentioned above.

In order to respond to this need, the present invention provides an accessory device, according to the following claim 1 and the related dependent claims.

In a further aspect, the present invention relates to a switching device, according to the following claim 12 and the related dependent claims.

Further characteristics and advantages of the present invention shall emerge more clearly from the description of preferred but not exclusive embodiments of the method as in the invention, and the control method thereof, illustrated purely by way of example and without limitation in the attached drawings, in which.

Figure 1:
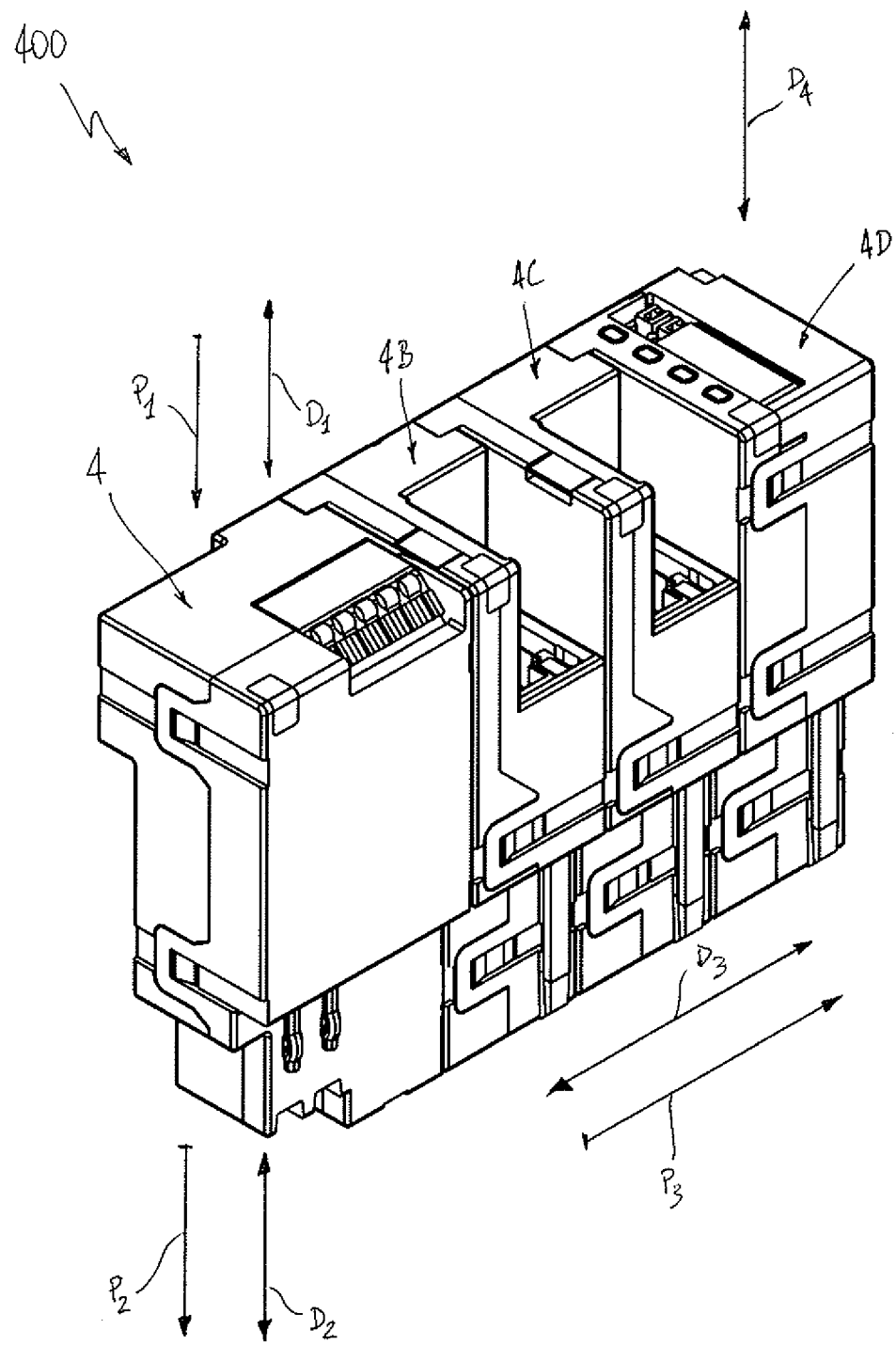
FIGS. 1-3 show different views of an accessory device assembly, according to the invention.

With reference to the mentioned figures, in a first aspect, the present invention relates to an accessory device assembly 400 for a low or medium voltage switching device 101, 102.

The switching device 101, 102 comprises a switching unit 2 that is provided with an external casing 21 that accommodates one or more electric poles (not shown).

The external casing 21 is preferably electrically insulating, at least partially.

Each electric pole comprises one or more movable contacts and corresponding fixed contacts.

The switching unit 2 preferably houses also a driving mechanism (not shown) that causes the movement of the movable contacts between a first coupling position (closed position), in which they are coupled to the corresponding fixed contacts, and a second separation position (open position), in which they are spaced away from the corresponding fixed contacts.

Preferably, the switching unit 2 is operatively associated with a protection and control (P&C) unit (not shown) that may be advantageously accommodated within the casing 21.

The accessory device assembly 400 comprises at least a first accessory device 4.

The accessory device 4 comprises a first external housing 40 (preferably insulating) having a first surface 410, a second surface 420 and a third surface 430.

Preferably, the accessory device 4 comprises a first control unit (not shown), accommodated in the external housing 40.

Such a control unit, for example a microprocessor, is advantageously arranged, so as to be capable of controlling the operation of the accessory device 4.

The accessory device 4 comprises first electrical connection means 41 for electrical connection with the switching device 101, 102, second electrical connection means 42 for electrical connection with outside equipment (not shown) and third electrical connection means 43 for electrical connection with a second accessory device 4B, 4C, 4D.

Preferably, the first, second and third electrical connection means 41, 42, 43 are positioned respectively on the first, second and third surface 410, 420, 430 of the external housing 40.

Preferably, the electrical connection means 41, 42, 43 are of the socket/plug type.

Preferably, the electrical connection means 41 comprise a first socket element, which is integrated with the external housing 40 at the first surface 410 and which can be connected with corresponding electrical connection means 22 or 24 of the switching device 101, 102.

The socket element 41 may advantageously comprise power socket contacts that are configured to form a power supply bus, through which the accessory device 4 is capable of providing electric power to components/devices comprised in the switching unit 2, such as, for example, the P&C unit.

The socket element 41 may advantageously comprise communication socket contacts that are configured to form a communication bus (for example a CAN bus), through which the accessory device 4, in particular the first control unit thereof, is capable of exchanging control/data signals with components/devices comprised in the switching unit 2, such as, for example, the mentioned P&C unit.

Preferably, the electrical connection means 42 comprise a second socket element, which is integrated with the external housing 40 at the second surface 420 and which can be connected with corresponding electrical connection means (not shown) of the outside equipment or with a power supply/communication bus electrically connected with this latter.

The socket element 42 may advantageously comprise power socket contacts that are configured to form a power supply bus, through which the accessory device 4 is capable of receiving electric power from the outside equipment, and communication socket contacts that are configured to form a communication bus (for example a CAN bus), through which the accessory device 4, in particular the first control unit thereof, is capable of exchanging control/data signals with said outside equipment.

Preferably, the electrical connection means 43 comprise a third socket element, which is integrated with the external housing 40 at the third surface 430 and which can be connected with corresponding electrical connection means 41B of a second accessory device 4B, 4C, 4D.

The socket element 43 may advantageously comprise power socket contacts that are configured to form a power supply bus, through which the accessory device 4 is capable of providing electric power to the second accessory device 4B, 4C, 4D, and communication socket contacts that are configured to form a communication bus (for example a CAN bus), through which the accessory device 4, in particular the first control unit thereof, is capable of exchanging control/data signals with the second accessory device 4B, 4C, 4D.

According to the invention, the accessory device 4 comprises also first mechanical connection means 44 for mechanical connection with a second accessory device 4B, 4C, 4D and second mechanical connection means 45 for mechanical connection with the switching device 101, 102.

Preferably, the mechanical connection means 44 are positioned on the third surface 430 of the external housing 40.

Advantageously, the mechanical connection means 44 are arranged so as to be geometrically conjugate or be complementary with corresponding mechanical connection means 46B of a second accessory device 4B, 4C, 4D.

The mechanically connection means 44 may advantageously comprise a first mechanical connection hole, which is obtained on the third surface 430 and is configured to engage a corresponding mechanical connection pin 46B of the second accessory device 4B, 4C, 4D, and first mechanical connection recesses, which are obtained on the third surface 430 and are configured to engage corresponding mechanical connection walls 46B of the second accessory device 4B, 4C, 4D.

Preferably, the mechanical connection means 45 are positioned on the first surface 410 of the external housing 40.

Advantageously, the mechanical connection means 45 may be arranged so as to be geometrically conjugate or be complementary with corresponding mechanical connection means 23 or 51 of the switching device 101, 102.

The mechanically connection means 45 may comprise second mechanical connection shaped surfaces, which are obtained on the first surface 410 and are configured to engage corresponding mechanical connection shaped surfaces 23 or 51 of the switching device 101, 102.

Preferably, the accessory device 4 comprises first light signalling means 48 configured to provide light signals indicative of its operating status.

Preferably, the light signalling means 48 comprise one or more LED elements positioned at one or more surfaces of the external housing 40 (e.g. the surface 420).

Preferably, at one of the surfaces of the external housing 40, the accessory device 4 comprises safety means 49 for mechanically locking with the switching device 101, 102.

The safety means 49 may advantageously comprise a safety lever that comprises a lever arm 49A that is operatively associated with one or more lever pins 49B that can be moved by the lever arm 49A between an unlocking position, according to which they allow the accessory device 4 to be uncoupled from the switching device 101, 102, and a locking position, according to which they prevent the accessory device 4 from being uncoupled from the switching device 101, 102.

In a preferred embodiment of the present invention, the accessory device assembly 400 comprises one or more second accessory devices 4B, 4C, 4D, operatively associated with the first accessory device 4.

Although the accessory devices 4B, 4C, 4D might have different operating functionalities one another, they are advantageously arranged, so as to be operatively associated with the first accessory device 4 in a modular manner.

Figure 2:
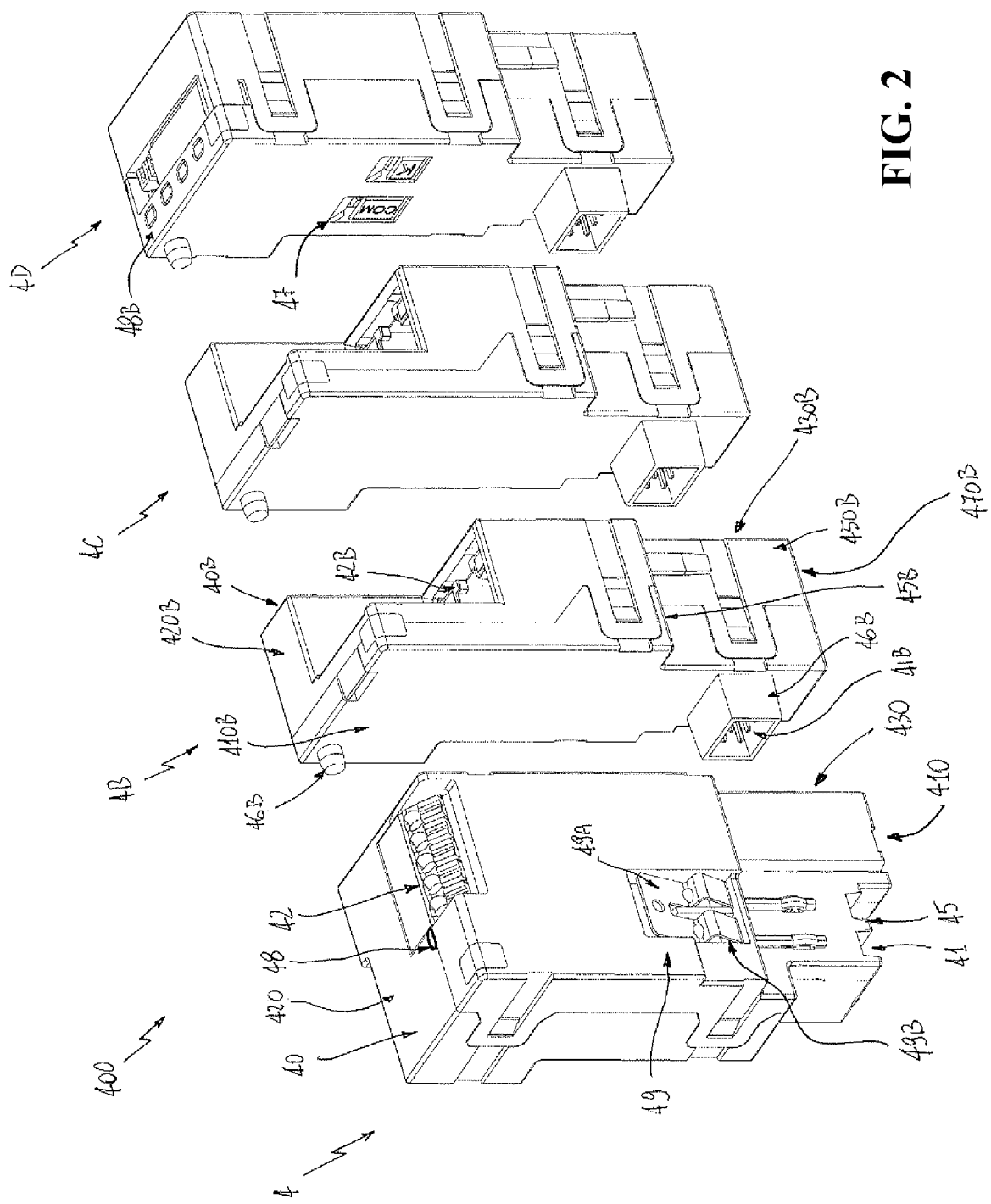
Figure 3:
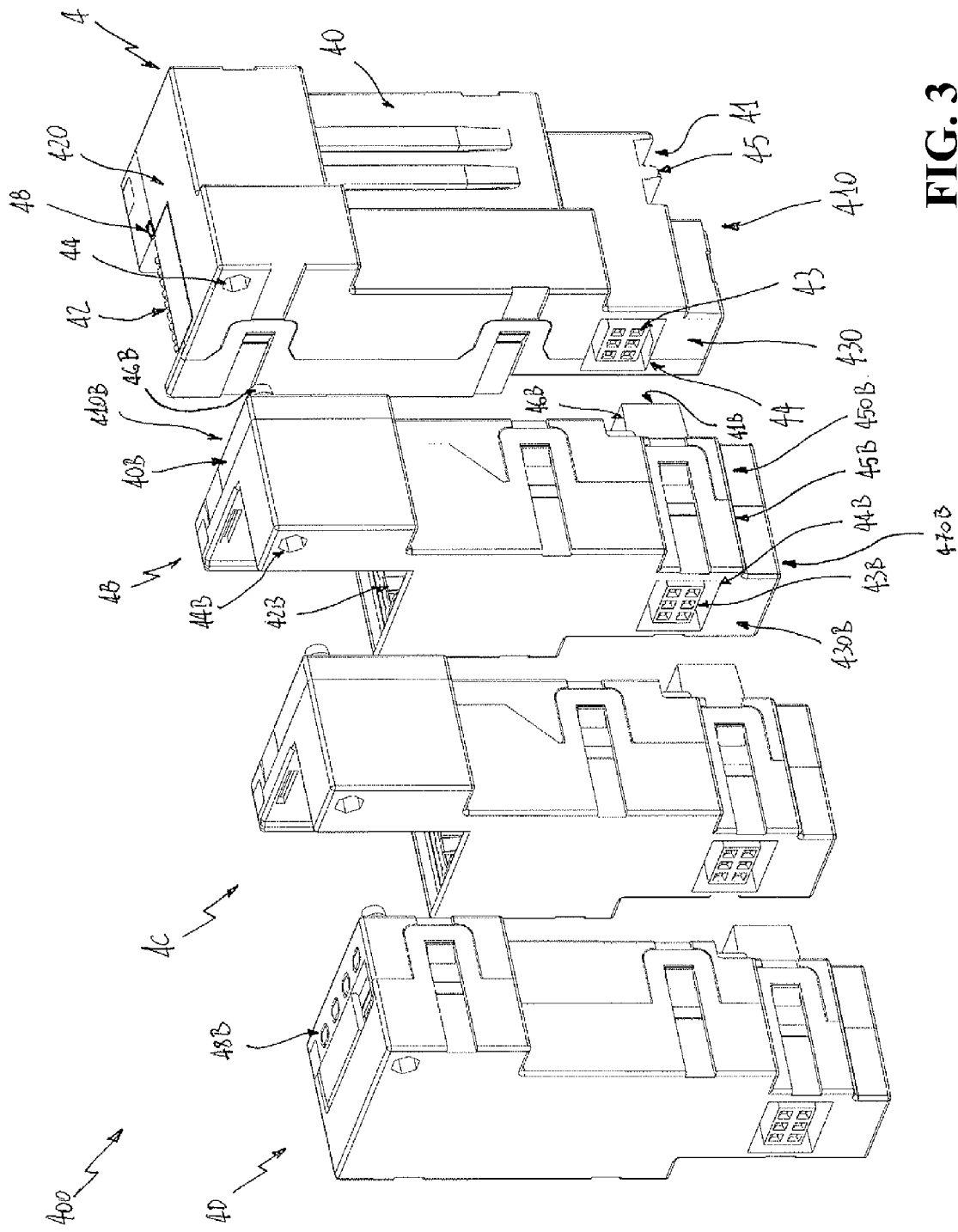
Figure 4:
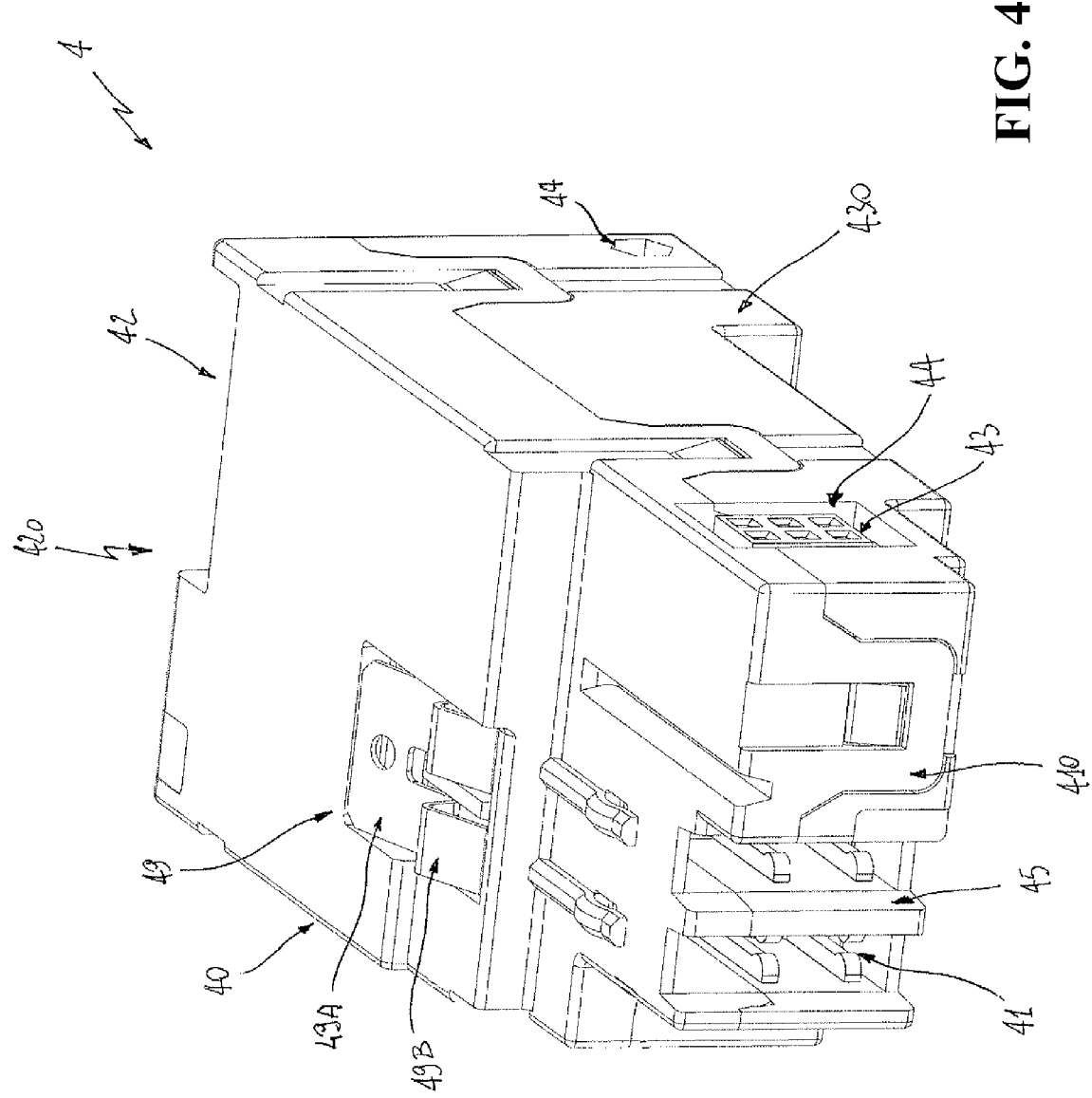
FIG. 4 shows an accessory device comprised in the accessory device assembly, according to the invention.
Figure 5:
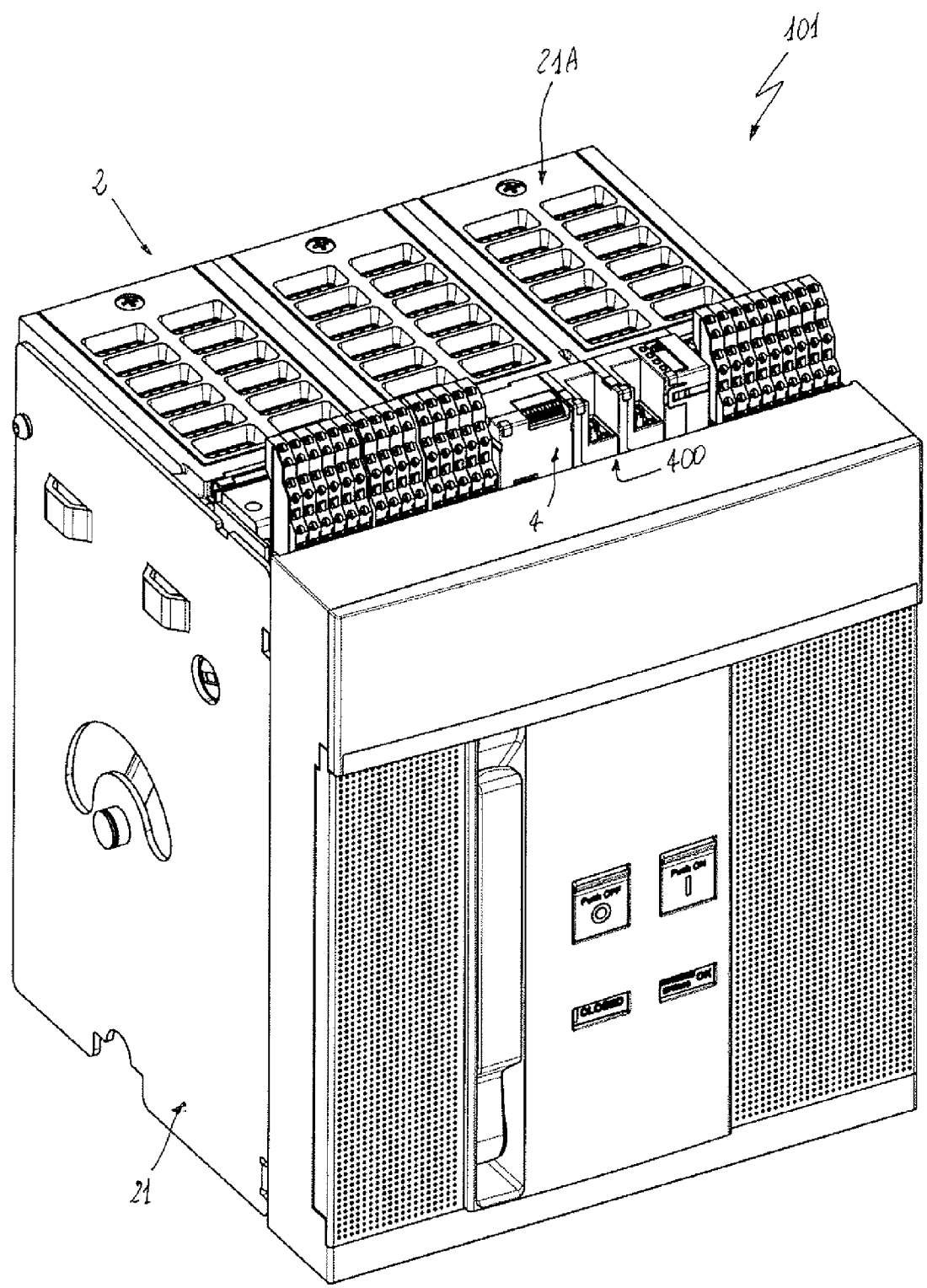
FIGS. 5-6 show different views of a switching device of the fixed type, which comprises an accessory device assembly, according to the invention.
Figure 6:
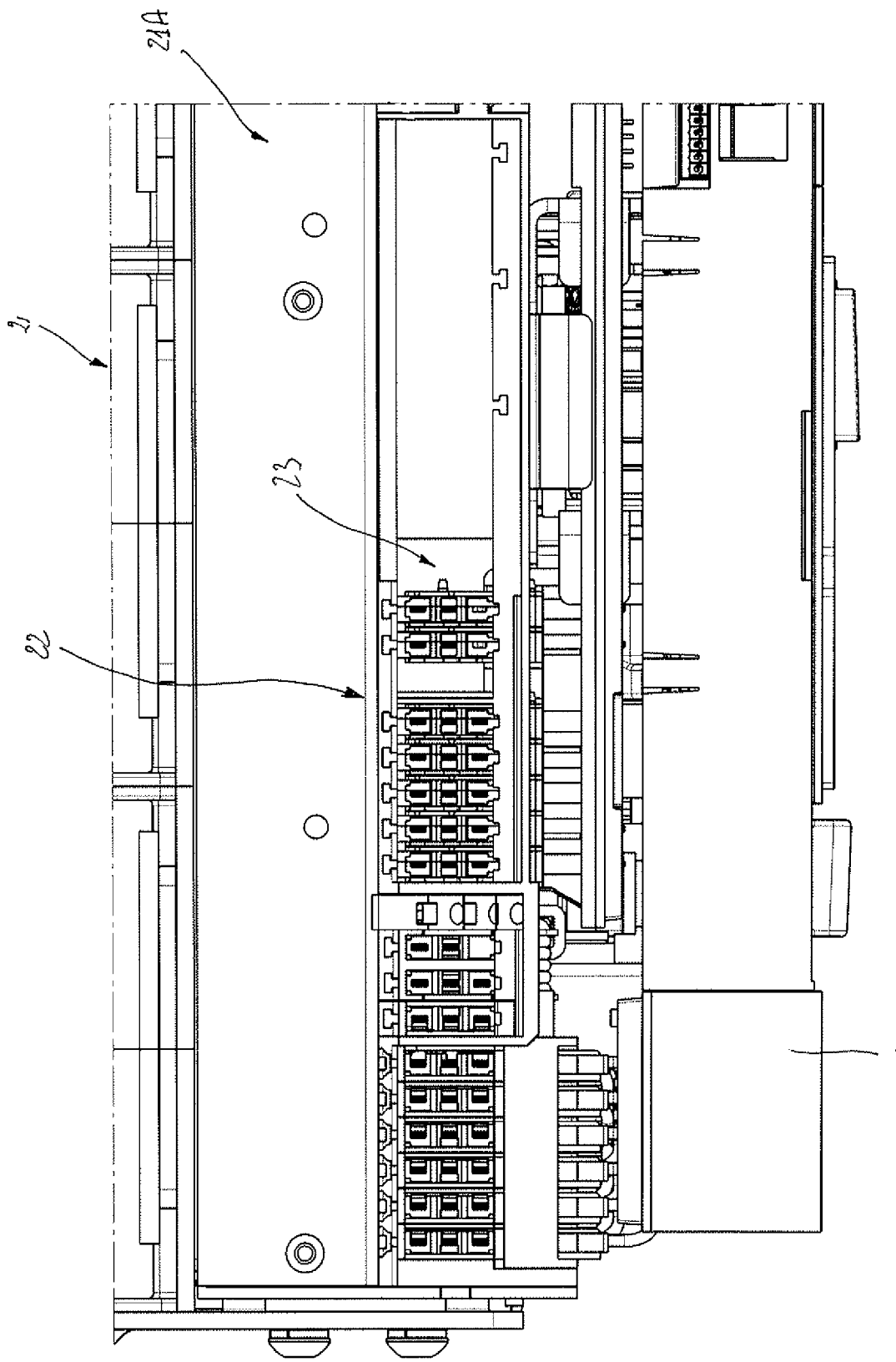
Figure 7:
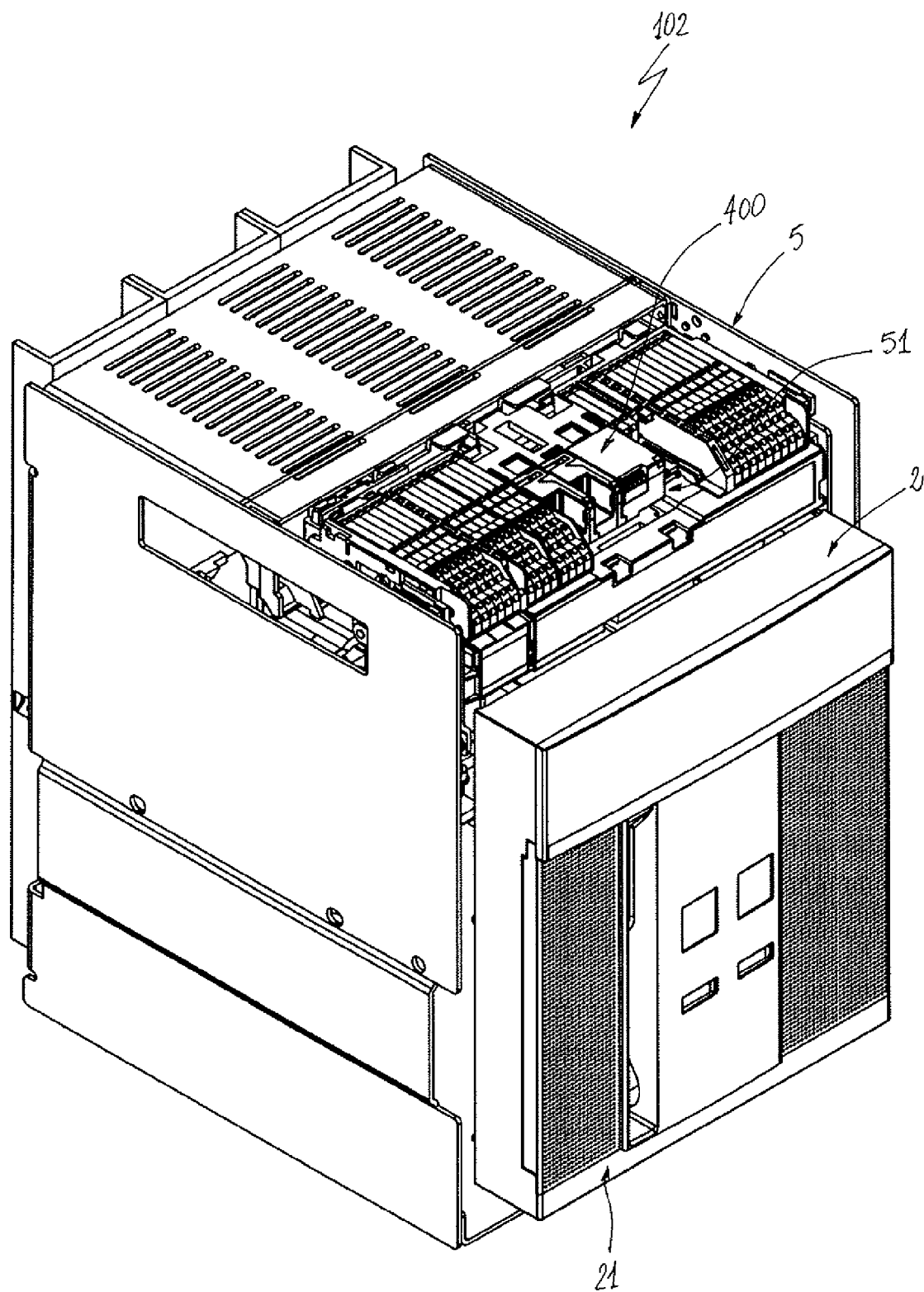
FIGS. 7-11 show different views of another switching device of the withdrawable type, which comprises an accessory device assembly, according to the invention.
Figure 8:
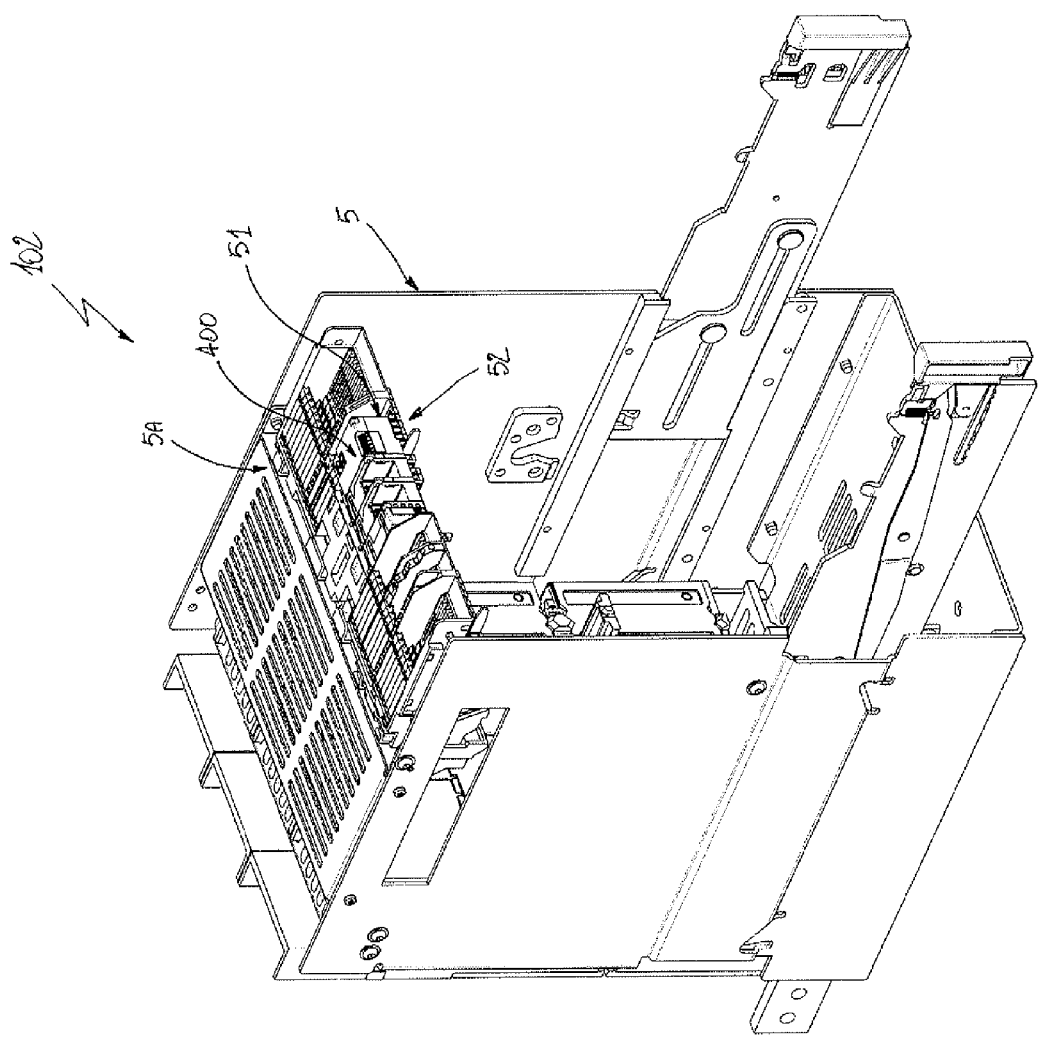
Figure 9:
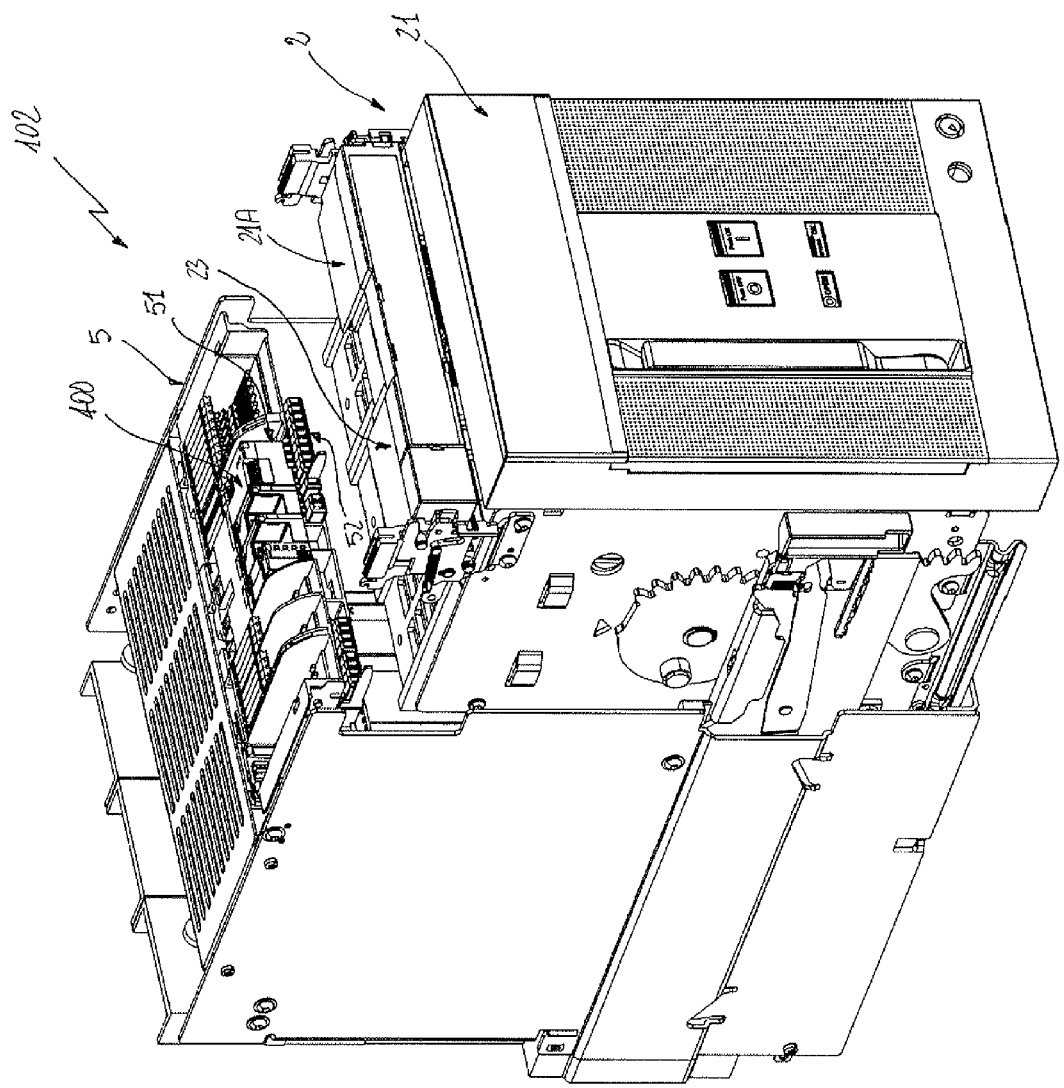
Figure 10:
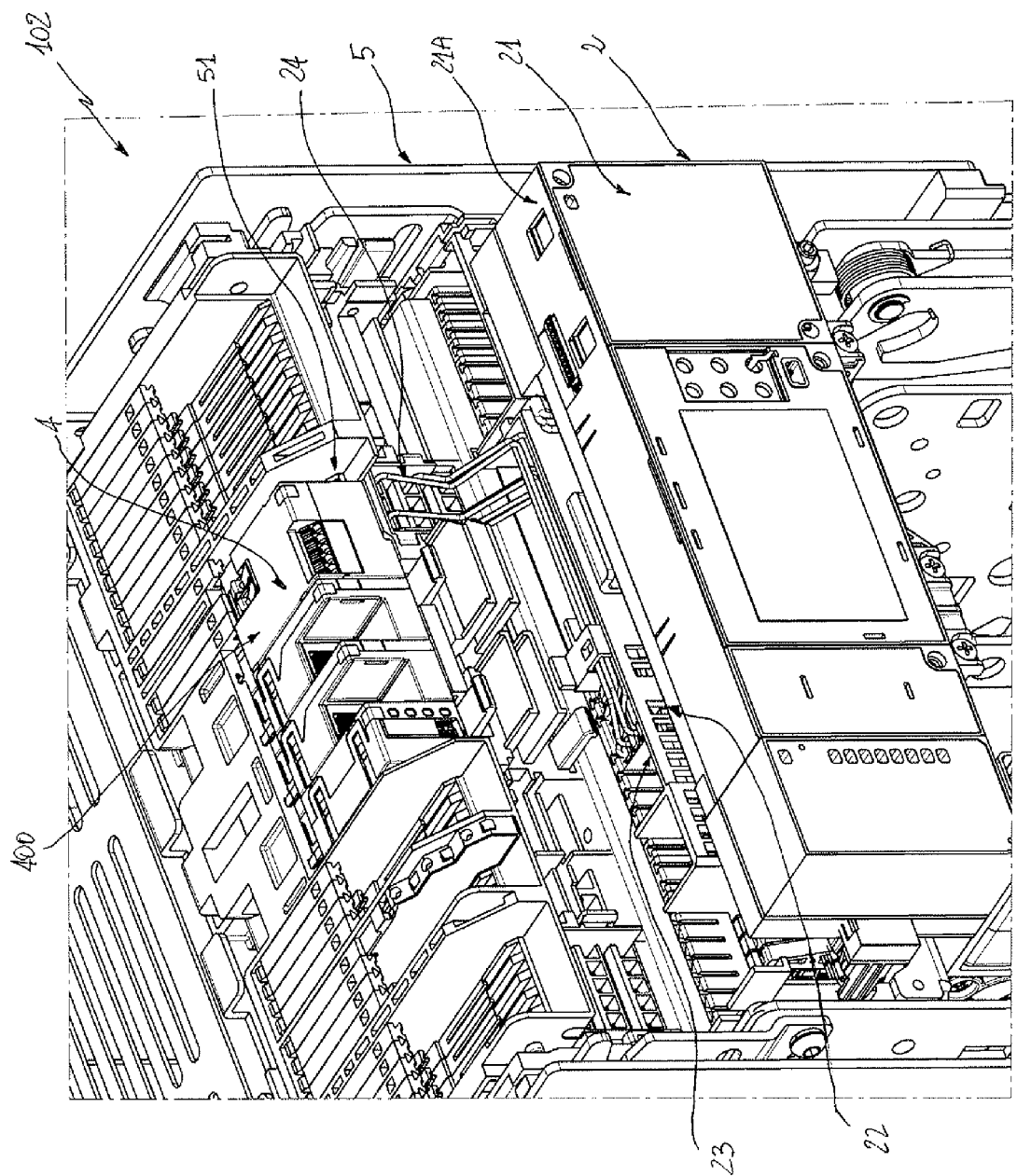
Figure 11:
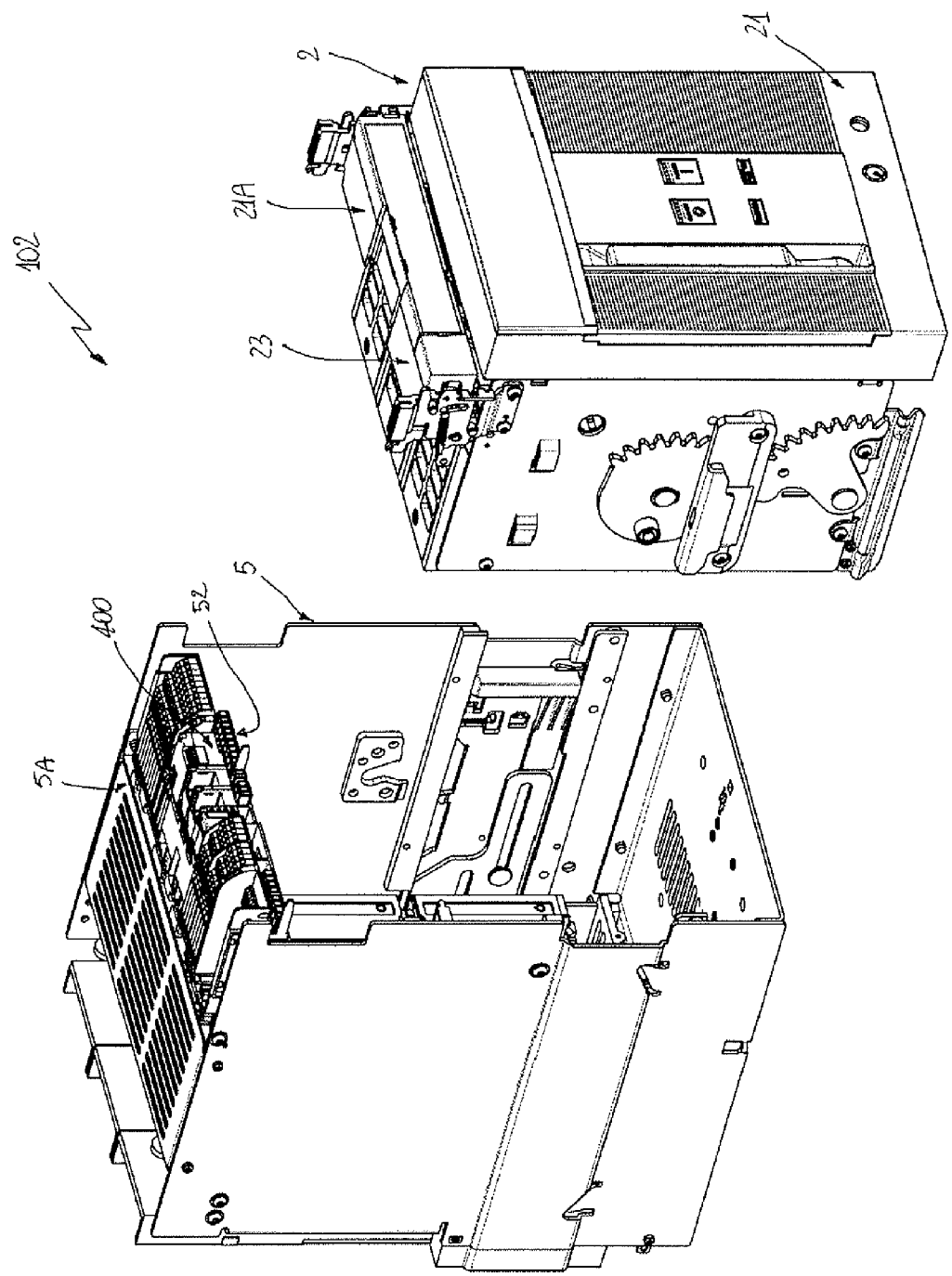

For example, as shown in FIGS. 1-3, the accessory device 4B, 4C, 4D may be operatively coupled respectively with the accessory device 4, the accessory device 4B and the accessory device 4C.

The accessory device assembly 400 has thus a modular structure (FIG. 3), in which each of the accessory devices 4B, 4C, 4D may be operatively arranged and positioned according to the needs.

Preferably, each accessory device 4B, 4C, 4D comprises a second external housing 40B (preferably insulating) having a fourth surface 410B, a fifth surface 420B, a sixth surface 430B, a seventh surface 450B and an eight surface 470B.

Preferably, the fourth surface 410B and the sixth surface 430B are positioned opposite one another, i.e. they are on opposite faces of the accessory device 4B.

Preferably, the fourth surface 410B is coupled with the surface 430 of the accessory device 4 or with the surface 430B of a further accessory device, when the accessory device assembly 400 is assembled.

Preferably, the sixth surface 430B may be coupled with the surface 410B of a further accessory device, when the accessory device assembly 400 is assembled.

Preferably, each accessory device 4B, 4C, 4D comprises a second control unit (not shown), accommodated in the external housing 40B.

Said control unit, for example a microprocessor, is advantageously arranged so as to be capable of controlling the operation of the accessory device 4B, 4C, 4D.

Preferably, each accessory device 4B, 4C, 4D comprises fourth electrical connection means 41B for electrical connection the accessory device 4 or a further accessory device.

Preferably, the electrical connection means 41B are positioned on the fourth surface 410B of the external housing 40B.

Preferably, the electrical connection means 41B are of the socket/plug type.

Preferably, the electrical connection means 41B comprise a fourth plug element, which is integrated with the external housing 40B at the fourth surface 410B and which can be connected with corresponding electrical connecting means 43 of the accessory device 4 or 43B of a further accessory device.

The plug element 41B may advantageously comprise power plug pins that are configured to form a power supply bus, through which the accessory device 4B is capable of receiving electric power from the accessory device 4.

The plug element 41B may advantageously comprise communication plug pins that are configured to form a communication bus (for example a CAN bus), through which the accessory device 4B, in particular the second control unit thereof, is capable of exchanging control/data signals with the accessory device 4 or with a further accessory device.

Preferably, at least one of the accessory devices 4B, 4C, 4D comprises fifth electrical connection means 42B for electrical connection with outside equipment (not shown).

Preferably, the electrical connection means 42B are positioned on the fifth surface 420B of the external housing 40B.

Preferably, the electrical connection means 42B are of the socket/plug type.

Preferably, the electrical connection means 42B comprise a fifth socket element, which is integrated with the external housing 40B at the second surface 420B.

The socket element 42B may advantageously be a communication socket that can be connected with a communication bus (e.g. a bus implementing Ethernet, MODBUS or PROFI-BUS communication protocols), through which the accessory device 4B, 4C, 4D, in particular the second control unit thereof, is capable of exchanging control/data signals with said outside equipment.

Preferably, each accessory device 4B, 4C, 4D comprises third mechanical connection means 46B for mechanical connection with the accessory device 4 or a further accessory device.

Preferably, the mechanical connection means 46B are positioned on the fourth surface 410B of the external housing 40B.

Advantageously, the mechanical connection means 46B are arranged so as to be geometrically conjugate or be complementary with corresponding mechanical connection means 44 of the accessory device 4 or 44B of a further accessory device.

The mechanically connection means 46B may advantageously comprise a third mechanical connection pin, which protrudes from the fourth surface 410B and is configured to engage a corresponding mechanical connection hole 44 of the accessory device 4 or a corresponding mechanical connection hole 44B of a further accessory device.

The mechanically connection means 46B may also advantageously comprise third mechanical connection walls that protrude from the fourth surface 410B and are configured to engage corresponding mechanical connection recesses 44 of the accessory device 4 or corresponding mechanical connection recesses 44B of a further accessory device.

Preferably, each second accessory device 4B, 4C, 4D comprises sixth electrical connection means 43B for electrical connection with a further accessory device.

Preferably, the electrical connection means 43B are positioned on the sixth surface 430B of the external housing 40B, which is opposite with respect to the fourth surface 410B.

Preferably, the electrical connection means 43B are of the socket/plug type.

Preferably, the electrical connection means 43B comprise a sixth socket element, which is integrated with the external housing 40B at the sixth surface 430B and which can be connected with corresponding electrical connection means 41B of a further accessory device.

The socket element 43B may advantageously comprise power socket contacts that are configured to form a power supply bus, through which a further accessory device is capable of receiving electric power from the first accessory device 4 (via the second accessory device 4B, 4C, 4D), and communication socket contacts that are configured to form a communication bus (for example a CAN bus), through which the second accessory device 4B, 4C, 4D is capable of exchanging control/data signals with a further accessory device.

Preferably, each second accessory device 4B, 4C, 4D comprises fourth mechanical connection means 44B for mechanical connection with a further accessory device.

Preferably, the mechanical connection means 44B are positioned on the sixth surface 430B of the external housing 40B.

Advantageously, the mechanical connection means 44B are arranged so as to be geometrically conjugate or be complementary with corresponding mechanical connection means 46B of a further accessory device.

The mechanically connection means 44B may advantageously comprise a fourth mechanical connection hole, which is obtained on the surface 430B and is configured to engage a corresponding mechanical connection pin 46B of a further accessory device, and fourth mechanical connection recesses, which are obtained on the surface 430B and are configured to engage corresponding mechanical connection walls 46B of a further accessory device.

Preferably, each second accessory device 4B, 4C, 4D comprises fifth mechanical connection means 45B for mechanical connection with the switching device 1.

Preferably, the mechanical connection means 45B are positioned on the seventh surface 450B and/or the eighth surface 470B of the external housing 40B.

Advantageously, the mechanical connection means 45B may be arranged so as to be geometrically conjugate or be complementary with corresponding mechanical connection means 23 or 51 of the switching device 1.

The mechanically connection means 45B may comprise fifth mechanical connection shaped surfaces, which are obtained on the surface 450B and/or 470B and are configured to engage corresponding mechanical connection shaped surfaces 23 or 51 of the switching device 1.

Preferably, one or more of the second accessory devices 4B, 4C, 4D may comprise one or more first micro-switches (not shown), which are operatively associated with the driving mechanism of the switching unit 2.

The first micro-switches are actuated by the driving mechanism of the switching unit 2 between two signalling positions, each of which corresponds to an open/closed position of the electric contacts of the electric poles of the switching unit 2.

The mentioned first micro-switches may be positioned at one or more surfaces of the external housing 40B (preferably at the eighth surface 470B).

Preferably, one or more of the second accessory devices 4B, 4C, 4D may comprise one or more second micro-switches 47 (DIP-switches), which can be manually operated before the installation of the switching device accessories or during their operating life.

The second micro-switches 47 may be positioned at one or more surfaces of the external housing 40B (preferably at the surface 410B).

Preferably, one or more of the second accessory devices 4B, 4C, 4D may comprise second light signalling means 48B configured to provide light signals indicative of the operating status of the accessory device.

The light signalling means 48B comprise one or more LED elements positioned at one or more surfaces of the external housing 40B (preferably at the surface 420B).

In FIG. 1, the assembled accessory device assembly 400 is shown.

In the accessory device assembly 400, the accessory device 4 advantageously is arranged to form a power/communication interface module between the switching unit 2, the outside equipment and the accessory devices 4B, 4C, 4D.

The electrical connection means 42, 41 of the accessory device 4 are arranged to form respectively a first and second power supply bus $P_1$, $P_2$, through which the accessory device 4 is capable of receiving electric power from the outside equipment and feeding the internal components/device of the switching unit 2, in particular to the P&C unit.

The electrical connection means 42, 41 of the accessory device 2 are arranged to form respectively a first and second communication bus $D_1$, $D_2$, through which the accessory device 4 is capable of communicating with the outside equipment and with the internal components/device of the switching unit 2, in particular with the P&C unit.

The electrical connection means 43 of the accessory device 4 and the electrical connection means 41B and 43B of each accessory device 4B, 4C, 4D are arranged to form a third power supply bus $P_3$, through which each accessory device 4B, 4C, 4D is fed by the accessory device 4.

The electrical connection means 43 of the accessory device 4 and the electrical connection means 41B and 43B of each accessory device are arranged to form a third communication bus $D_3$, through which the accessory device 4 is capable of communicating with each of the accessory devices 4B, 4C, 4D.

The electrical connection means 42B of each accessory device 4B, 4C, 4D are arranged to form a fourth communication bus $D_4$, through which each accessory device 4B, 4C, 4D is capable of communicating with the outside equipment.

In a further aspect, the present invention relates to a switching device 101 of the fixed type that comprises the switching device assembly 400.

A switching device 101 of the fixed type is shown in figured 5-6.

The switching device 101 comprises the switching unit 2 that is basically arranged as described above.

The switching unit 2 has the external casing 21 permanently fixed to a supporting structure of a cabinet (not shown).

The switching unit 2 comprises first electrical connections 22 that are positioned on an outer surface 23 of the external casing 21.

Preferably, the first electrical connections 22 comprises one or more electrical conductors having a terminal board that is integrated with the external casing 21 and is advantageously electrically connected with internal components/devices of the switching unit 2, such as, for example, the P&C unit.

The switching device 101 comprises an accessory device assembly 400 positioned outside of the external casing 21.

In particular, the accessory device assembly 400 is positioned at the outer surface 23 of the external casing 21.

Preferably, the outer surface 23 is positioned at a first top side 21A of the external casing 21, with reference to a normal installation position of this latter.

The accessory device assembly 400 is operatively positioned on the outer surface 23, so as to be substantially oriented as the switching unit 2 in its installation position.

When the accessory device assembly 400 is operatively positioned at the outer surface 23, the surface 410 of the accessory device 4 and the surfaces 450B and 470B of the accessory devices 4B, 4D, 4D are advantageously coupled with outer surface 23.

When the accessory device assembly 400 is operatively positioned on the outer surface 23, an electrical connection, preferably of the plug/socket type, is established between the electrical connection means (the first socket element) 41 of the accessory device 4 and the first electrical connections (the terminal board) 22 of the switching unit 2.

Advantageously, the outer surface 23 is shaped so as to engage the mechanical connections means 45 of the accessory device 4 and the fifth mechanical connections means of each accessory device 4B, 4C, 4D, so as to and establish a mutual mechanical connection.

Once the accessory device assembly 400 is operatively positioned at the outer surface 23, the safety means 49 of the accessory device 4 can be advantageously operated.

The lever arm 49A can be manually moved in its locking position, so that the lever pins 49B can prevent the accessory device 4 (and the whole accessory device assembly 400) from being uncoupled from the outer surface 2.

The arrangement of the accessory device 400 outside the external casing 21 of the switching unit 2 provides relevant advantages.

The internal structure of the switching unit 2 is simplified, since the overall number of components can be remarkably reduced.

Further, wiring operations for the installation of the switching device 101 are facilitated, since most of the electrical connections between the switching unit 2 and the accessory devices 4, 4B, 4C, 4D can be concentrated in a specific wiring area, i.e. at the outer surface 23.

The accessory device assembly 400 can be easily accessed by an operator without intervening on the internal structure of switching unit 2.

This remarkably simplifies the execution of maintenance or re-configuration interventions during the operating life of the switching device 101.

Finally, the presence of each accessory device 4, 4B, 4C, 4D can be easily quickly checked by an operator, during the installation of the switching device 101.

This may be quite advantageous during the execution of installation or maintenance operations on switchboards having complex structures comprising a huge number of switching devices.

In a further aspect, the present invention relates to a switching device 102 of the withdrawable type that comprises the switching device assembly 400.

A switching device 101 of the withdrawable type is shown in figured 7-11.

The switching device 102 comprises the switching unit 2 that is basically arranged as described above.

The switching unit 2 comprises first electrical connections 22 (sliding contacts) that are positioned on an outer surface 23 of the external casing 21, which is preferably positioned at a first top side 21A of the external casing 21, as mentioned above for the switching device 101.

The switching device 102 comprises a supporting frame 5, into/from which the switching unit 2 can be inserted/withdrawn.

Also in this case, the accessory device assembly 400 is positioned outside of the external casing 21 of the switching unit 2.

In particular, the accessory device assembly 400 is housed in one or more seats 51 of the supporting frame 5.

Preferably, the seats 51 are positioned at a second top side 5A of the supporting frame 5, with reference to a normal installation position of this latter.

The accessory device assembly 400 is operatively positioned in the seats 51, so as to be oriented substantially in a perpendicular manner with respect to the switching unit 2 in its installation position.

When the accessory device assembly 400 is operatively positioned in the seats 51, the surface 410 of the accessory device 4 and the surfaces 450B and 470B of the accessory devices 4B, 4C, 4D are advantageously coupled with the internal surface (not shown) of the seats 51.

The switching device 102 comprises second electrical connections 24, which are electrically connectable with the first electrical connections 22 of the switching unit 2.

The switching device 102 comprises also third electrical connections 52 (sliding contacts), which are positioned on the supporting frame 5 and are electrically connectable between the electrical connections 24, and the first electrical connection means 41 of the accessory device 4.

Preferably, the electrical connections 24, 52 may comprise one or more electrical conductors having terminal boards of the plug/socket type.

When the accessory device 4 or the accessory device assembly 400 is operatively positioned in the seats 51 of the supporting frame 5, the electrical connection means 41 of the accessory device 4 are connected with the electrical connections 52.

When the switching unit 2 is inserted into the supporting frame 5, the electrical connections 24 are connected between the electrical connections 22, 52 (sliding contacts).

When the switching unit 2 is withdrawn from the supporting frame 5, the electrical connections 24 are unplugged without intervening on the accessory device assembly 400.

Advantageously, the seats 51 are shaped so as to engage the mechanical connections means 45 of the accessory device 4 and the mechanical connections means 45B of each accessory device 4B, 4C, 4D, so as to establish a mutual mechanical connection, when the accessory device assembly 400 is operatively positioned on the supporting frame 5.

Once the accessory device assembly 400 is operatively positioned on the supporting frame 5, the safety means 49 of the accessory device 4 can be advantageously operated, so as to prevent the accessory device 4 (and the whole accessory device 400) from being uncoupled from the supporting frame 5.

The arrangement of the accessory device assembly 400 on the supporting frame 5 basically provides the same relevant advantages described for a switching device 101 of the fixed type.

A further advantage resides in the fact that the switching unit 2 can be easily inserted/withdrawn into/from the supporting frame 5 without intervening on the accessory device assembly 400.

The accessory device assembly 400 can thus remain connected with the outside equipment and can continue to interact with this latter.

Even if the switching unit 2 is removed from the supporting frame 5, the accessory device 4 can still be powered by the outside equipment and feed the accessory devices 4B, 4C, 4D.

Similarly, the accessory devices 4, 4B, 4C, 4D can continue to communicate one another and/or with the outside equipment. They are thus capable of processing/storing data/information, in particular data/information acquired/processed before the withdrawal of the switching unit 2. For example, they can be used for storing the configuration data of the protection and control unit.

The accessory device assembly 400 may be subject to possible variants within the capacity of the skilled person.

For example, the number, the relative position and the typology of the accessory devices 4, 4B, 4C, 4D may vary according to the needs, depending on the required functionalities.

The accessory device assembly, according to the invention, has proven to be of relatively easy and cheap realization at industrial level and practical installation on the field.

The invention claimed is:

1. Accessory device assembly for a low or medium voltage switching device comprising at least a first accessory device comprising a first external housing, first electrical connection means for electrical connection with said switching device, second electrical connection means for electrical connection with outside equipment, third electrical connection means for electrical connection with a second accessory device, first mechanical connection means for mechanical connection with said second accessory device and second mechanical connection means for mechanical connection with said switching device;

wherein at least the second accessory device is operatively associated with said first accessory device, said second accessory device comprising a second external housing, fourth electrical connection means for electrical connection with a further accessory device and third mechanical connection means for mechanical connection with said further accessory device;

wherein said second accessory device comprises fifth electrical connection means for electrical connection with outside equipment;

wherein said fourth and fifth electrical connection means are positioned respectively on a fourth and fifth surface of said second external housing, said third mechanical connection means being positioned on the fourth surface of said second external housing;

wherein said second accessory device comprises sixth electrical connection means for electrical connection with a further accessory device and fourth mechanical connection means for mechanical connection with a further accessory device;

wherein said sixth electrical connection means and said fourth mechanical connection means are positioned on a sixth surface of said second external housing, said sixth surface being opposite to the fourth surface of said second external housing.

2. Accessory device assembly, according to claim 1, wherein said first, second and third electrical connection means are positioned respectively on a first, second and third surface of said first external housing.

3. Accessory device assembly, according to claim 2, wherein the accessory device assembly comprises safety means for mechanically locking said accessory device with said switching device.

4. Accessory device assembly, according to claim 1, wherein the accessory device assembly comprises safety means for mechanically locking said accessory device with said switching device.

5. Accessory device assembly, according to claim 1, wherein said second accessory device comprises fifth mechanical connection means for mechanical connection with said switching device.

6. Accessory device assembly, according to claim 5, wherein said fifth mechanical means are positioned on a seventh surface of said second external housing.

7. Accessory device assembly, according to claim 1, wherein said first, second, third, fourth, fifth and/or sixth electrical connection means are of the socket/plug type.

8. A switching device comprising a switching unit comprising an external casing that houses one or more electric poles and first electrical connections arranged on an outer surface of said external casing wherein the switching device comprises an accessory device assembly, according to claim 1, positioned outside of said external casing and electrically connected with said first electrical connections.

9. A switching device, according to claim 8, wherein said accessory device assembly is positioned on an outer surface of the external casing of said switching unit.

10. Accessory device assembly, according to claim 1, wherein said second accessory device comprises fifth mechanical connection means for mechanical connection with said switching device.

11. The accessory device of claim 1, wherein the first electrical connection means defines a direct electrical connection with the switching device.

12. A switching device comprising a switching unit comprising an external casing that houses one or more electric poles and first electrical connections arranged on an outer surface of said external casing wherein the switching device comprises an accessory device assembly positioned outside of said external casing and electrically connected with said first electrical connections;

the accessory device assembly comprising at least a first accessory device comprising a first external housing, first electrical connection means for electrical connection with said switching device, second electrical connection means for electrical connection with outside equipment, third electrical connection means for electrical connection with a second accessory device, first mechanical connection means for mechanical connection with said second accessory device and second mechanical connection means for mechanical connection with said switching device;

wherein the switching device comprises a supporting frame, into/from which said switching unit can be inserted/withdrawn, said accessory device assembly being housed in one or more seats of said supporting frame.

\* \* \* \* \*